United States Patent

Lynum et al.

[11] Patent Number: 5,951,960
[45] Date of Patent: Sep. 14, 1999

[54] ELECTRODE CONSUMPTION IN PLASMA TORCHES

[75] Inventors: Steinar Lynum, Oslo; Ketil Hox, Trondheim; Nils Myklebust, Trondheim; Jan Hugdahl, Trondheim, all of Norway

[73] Assignee: Kvaerner Engineering, AS, Lysaker, Norway

[21] Appl. No.: 08/929,530

[22] Filed: Sep. 15, 1997

Related U.S. Application Data

[63] Continuation of application No. 08/307,835, Nov. 7, 1994, abandoned.
[51] Int. Cl.[6] ........................................................ C09C 1/98
[52] U.S. Cl. ................................................................ 423/458
[58] Field of Search .............................. 423/449.1, 458, 423/157.47

[56] References Cited

U.S. PATENT DOCUMENTS 3,333,927  8/1967  Baddour ................................. 23/209.3
4,116,639  9/1978  Fross ........................................ 423/456

FOREIGN PATENT DOCUMENTS 292920   10/1983   Germany .
1400266   7/1975   United Kingdom .
1492346  11/1977   United Kingdom .

*Primary Examiner*—Steven Bos
*Assistant Examiner*—Stuart L. Hendrickson
*Attorney, Agent, or Firm*—Jeffrey S. Melcher; Farkas & Manelli, PLLC

[57] ABSTRACT

Provided is a method for the reduction of electrode consumption in plasma torches during the processing and decomposition of hydrocarbons for the production of carbon black and hydrogen where hydrogen is supplied to the plasma torch as a plasma forming gas.

12 Claims, 1 Drawing Sheet

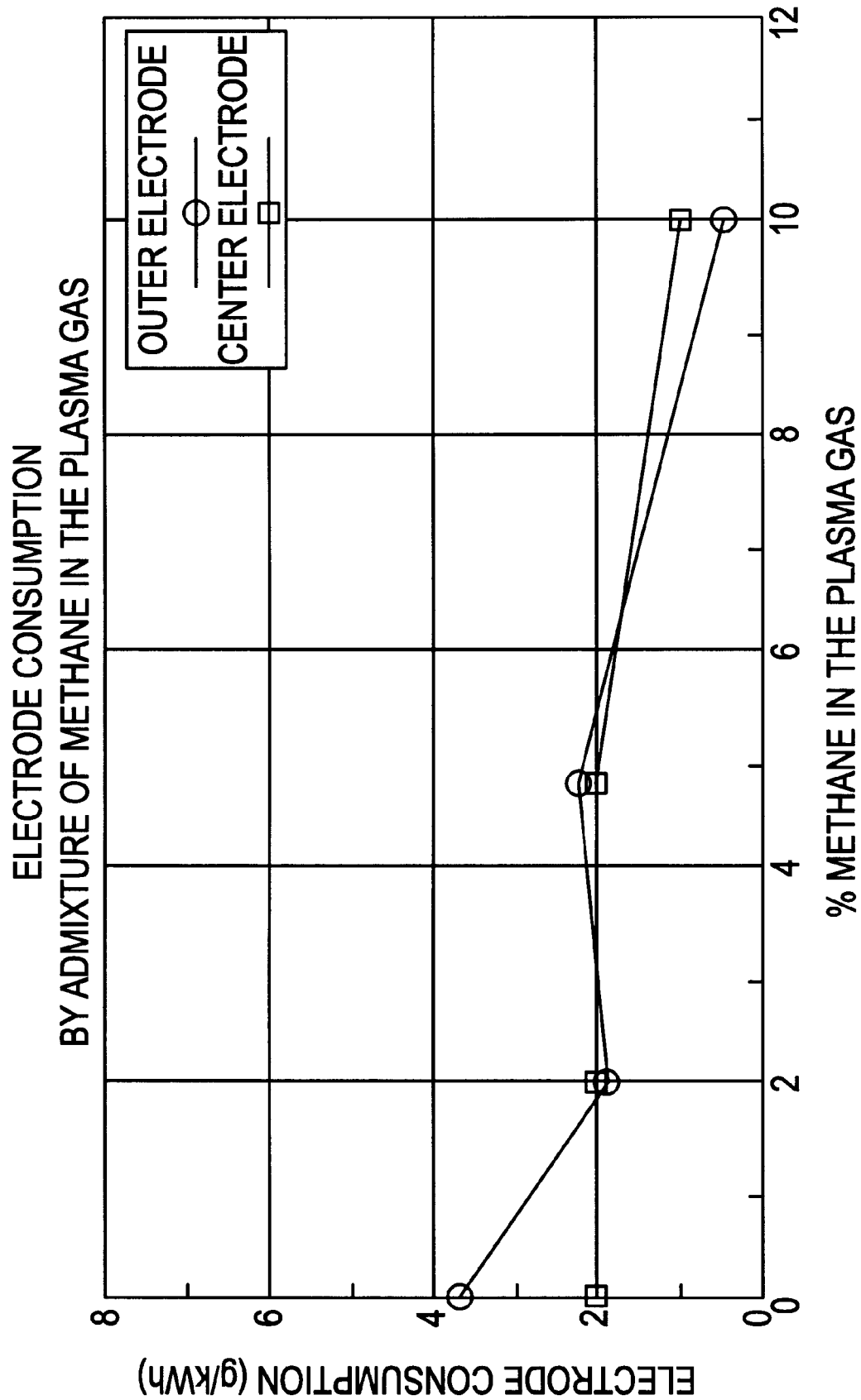

ELECTRODE CONSUMPTION IN PLASMA TORCHES

This is a continuation of application Ser. No. 08/307,835, filed on Nov. 7, 1994, now abandoned.

FIELD OF THE INVENTION

The invention relates to a method for the reduction of electrode consumption in plasma torches in the processing and decomposition of hydrocarbons.

BACKGROUND OF THE INVENTION

From DD 292 920 is known a method of producing high quality carbon black by pyrolysis of hydrocarbons in a plasma reactor. The hydrocarbon stock can be gaseous, liquid or solid. The plasma can be formed by hydrogen or an inert gas such as argon, or by a mixture of hydrogen and a hydrocarbon gas, or by hydrocarbon gas alone. However, it is not disclosed that the use of a mixture of hydrocarbon gas and hydrogen gas as a plasma-forming gas will reduce or have any effect on the electrode consumption in the plasma reactor.

From GB 1 400 266 is known a method of producing carbon black by pyrolysis of hydrocarbons in a plasma reactor. The apparatus consists of two electrodes located coaxially opposite each other. Hydrocarbons in a gaseous state is supplied for the formation or a plasma. Further, in order more fully to utilize the heat of the plasma and increase the yield, hydrocarbons can also be fed further down in the reaction chamber. However, it is not disclosed that the use of hydrocarbon gas as a plasma gas will reduce or have any effect on the electrode consumption in the plasma reactor.

In the processing and decomposition of natural gas in a plasma torch a consumption of electrodes will take place which results in the need to have these replenished or replaced after a period of use. This consumption is undesirable since the consumption causes a shutdown of the process, which can be time consuming and which constitutes a break in production in addition to the consumption of expensive electrode material.

One alternative has been the use of renewable electrodes of graphite or carbonaceous material Which can be continuously replenished and do not pollute the decomposition products. This will be cheaper than the use of non-consumable electrodes which are more complicated and more expensive in addition to their polluting the products.

SUMMARY OF THE INVENTION

The object of the invention is to provide a method for reducing the electrode material in plasma torches intended for the decomposition and processing of hydrocarbons regardless of whether the electrodes are composed of renewable or consumable electrodes.

This object is achieved by a method which is characterized by the features in the patent claims presented.

DETAILED DESCRIPTION OF THE INVENTION

The surprising discovery has been made that the hydrocarbons which are to be decomposed in the torch can be utilized in order to achieve a reduction in the electrode consumption by mixing these into the actual plasma gas. By adding the hydrocarbons directly to the plasma gas, the former are decomposed into hydrogen and carbon black in the actual flame zone where the electrode consumption takes place, and the produced carbon black is deposited in the same area in which the consumption occurs. In this manner a growth is obtained on the electrodes which entirely or partially can compensate for the consumption, thus causing the life of the electrodes to be manifestly extended.

By controlling the quantity of admixture of hydrocarbons, e.g. methane, and possibly also the introduction area for the gas and its temperature, it will be possible to control the deposit on the electrodes and thereby achieve this favourable effect.

This utilization of "fouling" on the electrodes as an advantageous effect is most surprising. Until now one of the greatest problems in the operation of plasma torches has been this very fouling on the electrodes during the decomposition. By proceeding according to the invention, however, this fouling effect is controlled and guided into a desired area by mixing natural gas with the actual plasma gas. Thus the life of the electrode can thereby be increased without the necessity of resorting to expensive means, since an available, reasonably priced natural gas is utilized. A particularly favourable effect is obtained if hydrogen is used in advance as plasma gas, in order to ensure that no change takes place in the composition of the plasma gas due to after-growth.

Trials have been carried out both with copper and graphite electrodes in which the same effect has been achieved for both types of electrodes. The effect obtained from the applicant's own experiments is described in the drawing, which shows electrode consumption as a function of % methane mixed with the hydrogen plasma gas.

Thus a considerable improvement in the operation of plasma torches has been achieved in a simple manner by the invention. A further advantage which is obtained is that the heating load on the electrodes can be reduced by the admixture of hydrocarbon gas, an effect which is particularly pronounced when hydrogen is used as plasma gas.

The electrode consumption in the case of carbon electrodes for the production of pure decomposition products from hydrocarbon gas can therefore be partially or entirely reduced by means of the invention with a guided and controlled admixture of hydrocarbon gas into the plasma gas. In order to be able to control the growth of the electrode at the consumption point the amount of admixture of natural gas can be appropriately regulated on the basis of control parameters which are calculated on the basis of the arc voltage of the plasma torch.

We claim:

1. A method for the reduction of electrode consumption in plasma torches during the processing and decomposition of hydrocarbons for the production of carbon black and hydrogen where hydrogen is supplied to the plasma torch as a plasma forming gas, the method comprising:

feeding natural gas or methane to the plasma-forming gas in an amount that is between 1% and 10% of the amount of the plasma-forming gas and controlling the amount of natural gas or methane such that carbon black is deposited on the electrode in an amount which at least partially compensates for the electrode consumption, whereby the life of said electrode is enhanced.

2. A method according to claim 1, wherein said natural gas or methane is added in such that carbon black is deposited on the electrode in an amount which entirely compensates for the electrode consumption.

3. A method according to claim 1, wherein said natural gas or methane is supplied to said plasma via a lead-in pipe that is separate from the hydrogen gas used to form the plasma.

4. A method according to claim 1, wherein said natural gas or methane is preheated before supplying said natural gas or methane to said plasma.

5. A method according to claim 1, wherein said electrode comprises copper.

6. A method according to claim 1, wherein said electrode comprises graphite.

7. A method for the reduction of electrode consumption in plasma torches during the processing and decomposition of hydrocarbons for the production of carbon black and hydrogen where a plasma-forming gas is supplied to the plasma torch, the method comprising:

feeding natural gas or methane to the plasma-forming gas in an amount that is between 1% and 10% of the amount of the plasma-forming gas and controlling the amount of natural gas or methane such that carbon black is deposited on the electrode in an amount which at least partially compensates for the electrode consumption, whereby the life of said electrode is enhanced.

8. A method according to claim 7, wherein said natural gas or methane is added in such that carbon black is deposited on the electrode in an amount which entirely compensates for the electrode consumption.

9. A method according to claim 7, wherein said natural gas or methane is supplied to said plasma via a lead-in pipe that is separate from the hydrogen gas used to form the plasma.

10. A method according to claim 7, wherein said natural gas or methane is preheated before supplying said natural gas or methane to said plasma.

11. A method according to claim 7, wherein said electrode comprises copper.

12. A method according to claim 7, wherein said electrode comprises graphite.

* * * * *